Figure 1:
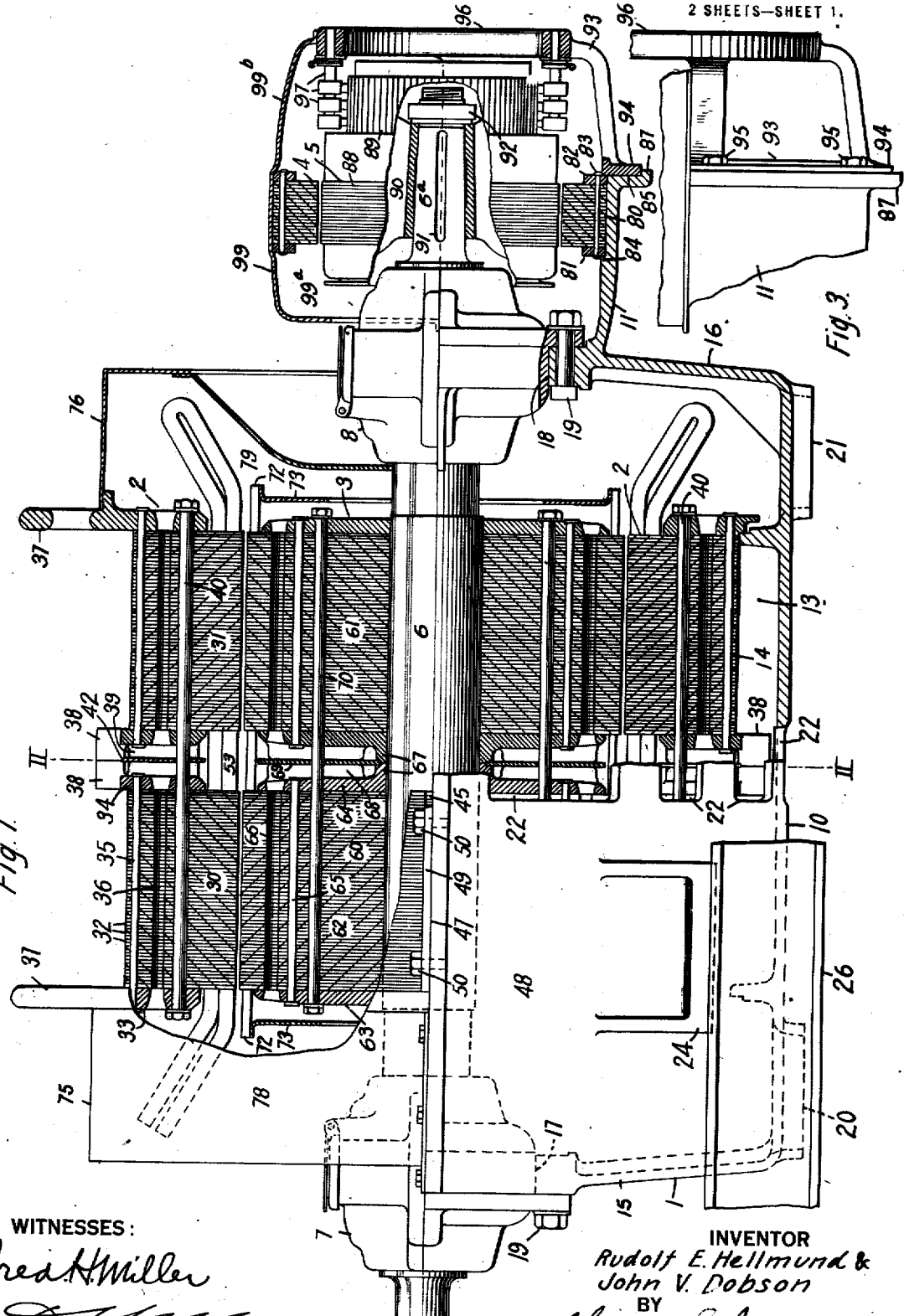

UNITED STATES PATENT OFFICE.

RUDOLF E. HELLMUND, OF PITTSBURGH, AND JOHN V. DOBSON, OF WILKINSBURG, PENNSYLVANIA, ASSIGNORS TO WESTINGHOUSE ELECTRIC AND MANUFACTURING COMPANY, A CORPORATION OF PENNSYLVANIA.

DYNAMO-ELECTRIC MACHINE.

1,318,756.     Specification of Letters Patent.     Patented Oct. 14, 1919.

Application filed March 20, 1915, Serial No. 15,800. Renewed March 1, 1919. Serial No. 280,142.

*To all whom it may concern:*

Be it known that we, RUDOLF E. HELLMUND, a subject of the German Empire, and a resident of Pittsburgh, in the county of Allegheny and State of Pennsylvania, and JOHN V. DOBSON, a citizen of the United States, and a resident of Wilkinsburg, in the county of Allegheny and State of Pennsylvania, have invented a new and useful Improvement in Dynamo-Electric Machines, of which the following is a specification.

Our invention relates to dynamo-electric machines, and it has special reference to machines of the type known as phase converters, such as are employed upon electric locomotives for the purpose of converting single-phase energy, which is received from the trolley distributing system, into polyphase energy which is supplied to the polyphase driving-motors.

One of the objects of our invention is to provide a machine of the above-indicated character which shall be simple, compact and durable in construction and light in weight, and the arrangement of parts of which shall be such as to minimize the cost of manufacture and assembly and shall also facilitate dismantling of the component elements for the purpose of replacement or repairs.

Another object of our invention is to provide a dynamo-electric machine of the inclosed type which shall be constructed and arranged to embody a ventilating system by means of which a liberal and free circulation of a cooling medium is maintained from the respective ends of the machine inwardly through longitudinal ventilating ducts in the stator and rotor core members into an intermediate ventilating space between the complemental rotor and stator half-members, from whence it is discharged, in a radial direction, in substantially the central plane of the machine.

Another object of our invention is to combine the phase converter with its starting motor in such manner as to economize material and space, substantially reduce the weight and number of parts of the apparatus, as a whole, and, moreover, to provide an overhung starting motor upon the converter shaft, the stator and rotor parts of which may be independently removed.

According to our invention we provide a single unitary lower half-frame member which serves, in common, for the phase converter and starting motor parts and which embodies co-axial semi-cylindrical seats of different diameters for receiving and supporting the stator core members of the converter and the starting motor. Co-axial seats are also provided to receive a pair of bearing members which carry the shaft upon which the converter and starting motor rotors are mounted.

Both the stator and the rotor core members of the phase converter comprise a pair of complete laminated half-units which are disposed in side-by-side relation and separated the one from the other to provide a liberal intermediate space. The half-units of the rotor and stator are rigidly fastened together to constitute a unitary and self-contained structure, and the structure thus formed is handled, in assembling the machine, as a single member.

The lower half-frame is provided with end inlet ventilating openings and a central row of discharge openings which communicate with the spaces intermediate the core member units. Thus, two separate and parallel paths of ventilating medium through the respective core member units are provided, baffle plates being disposed intermediate the several core member units for the purpose of obviating back pressures and permitting free and independent circulating currents.

Moreover, in order to permit of ready over-hauling of the starting motor parts, both its stator and rotor are positioned in such manner as to be longitudinally removed, the stator from an integral projecting end portion of the supporting half-frame and the rotor from a tapered end of the overhung shaft upon which it is mounted.

Figure 2:
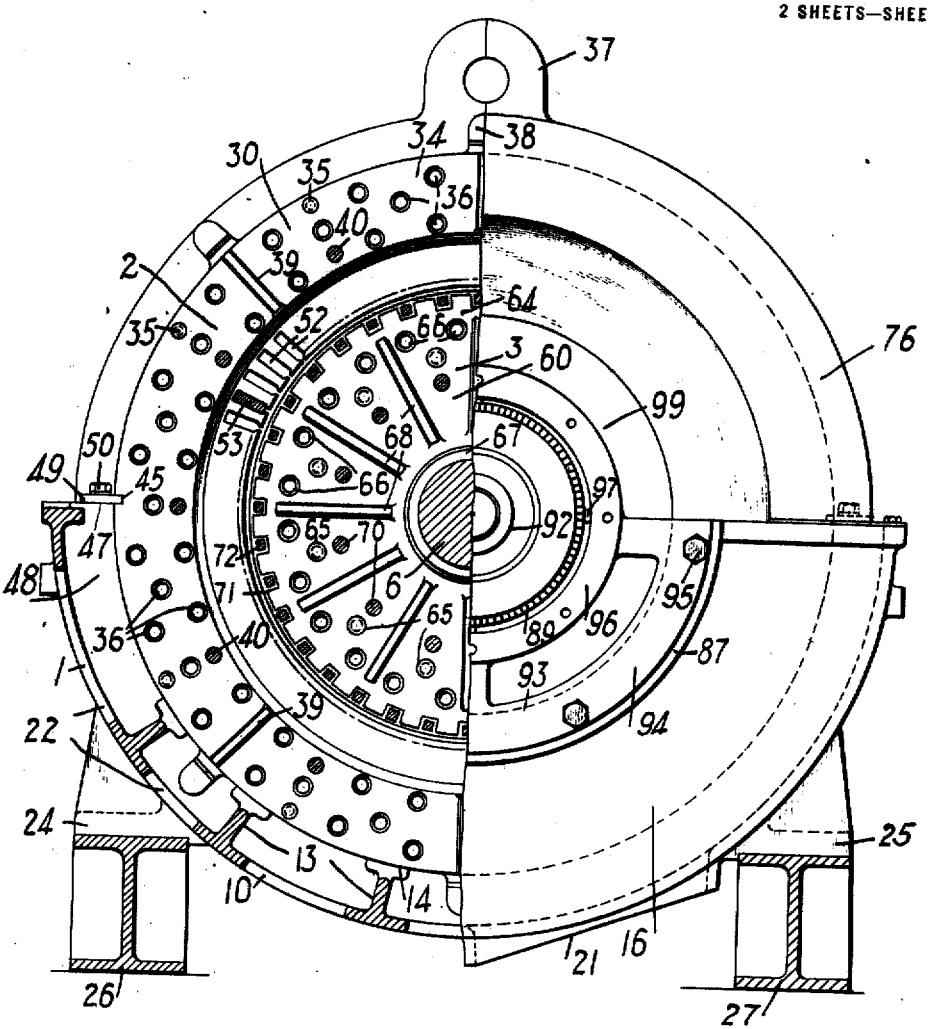

Our invention may best be understood by reference to the accompanying drawings, in which Figure 1 is a view, partially in side-elevation and partially in section of a dynamo-electric machine embodying a phase converter and its starting motor constructed in accordance with our invention, certain parts being broken away for the sake of clearness; Fig. 2 is a view, partially in end elevation and partially in section, of the apparatus shown in Fig. 1, the section being taken along the lines II—II of Fig. 1; and Fig. 3 is a view, in side elevation, of a portion of the starting motor shown in Figs. 1 and 2.

Referring to the drawings, the combined structure shown comprises a lower half-frame 1, a phase-converter stator 2, a phase-converter rotor 3, a starting-motor stator 4, a starting motor rotor 5, a shaft 6 and a plurality of bearing members 7 and 8.

The lower half-frame 1 comprises a main body portion 10 and an end projecting portion 11, the main portion 10 serving as the frame for the phase-converter parts, while the integral projecting portion 11 serves to support the starting motor elements. The main portion 10 of the lower half-frame 1 is provided with a plurality of longitudinally-disposed webs 13 which together constitute a cylindrical seat 14 to receive the cylindrical stator-core member 2 of the phase converter. Moreover, end portions 15 and 16 of the frame 10 are provided with co-axially related semi-cylindrical seats 17 and 18 upon which the bearing members 7 and 8 are positioned, being secured to said end portions by bolts 19.

The lower half-frame 1 is also provided with bottom end openings 20 and 21 through which a circulation of ventilating medium is introduced from any suitable source, while discharge openings 22 are provided in substantially the central plane of the frame 1 for the purpose of permitting the discharge of ventilating fluid.

A plurality of supporting lugs or feet 24 and 25 form integral parts of the lower half-frame 1 and may conveniently rest upon a plurality of supporting members 26 and 27 of any suitable form for the purpose of supporting the machine in position.

So far as the bearing members 7 and 8 are concerned, our invention is, of course, independent of the structural features thereof, and any well-known form of device for rotatably supporting the shaft 6 may be employed.

The phase-converter stator 2 comprises a pair of half-units 30 and 31 that are of like construction, each comprising a plurality of laminations 32 and end plates 33 and 34 that are disposed immediately adjacent the respective ends of the laminated core structures. The laminations and end plates, referred to, are fastened together to constitute a single and complete unit by means of rivets 35, and each core unit, such as described, is provided with a plurality of longitudinal ventilating ducts 36.

The outer end-plates 33 are provided with upwardly projecting eyes 37 by means of which the stator may be conveniently removed from the supporting half-frame 1, while the inner end-plates 34 embody a plurality of integral projecting lugs 38 and radially disposed vanes 39, for a purpose to be hereinafter set forth. The lugs 38 co-operatively engage each other in abutting relation to space the core half-units 30 and 31 apart. A plurality of tie-bolts or rods 40 project through suitable openings in the core half-units 30 and 31 for the purpose of clamping the units together to constitute a single and unitary rigid structure that may be handled and assembled or dismantled conveniently. A baffle plate 42 of annular form is interposed in the space intermediate the two core half-units 30 and 31 and is positioned by reason of its engagement with the radial vanes 39 as well as by the tie-bolts 40 which project through it.

The phase-converter stator 2, as just described, is seated upon the longitudinal webs 13 of the lower half-frame 1, which together form a semi-cylindrical seat therefor, and, in order to rigidly clamp the stator to the frame, said stator is provided with a plurality of oppositely-disposed longitudinally-projecting key-ways 45 which are located just above the upper surfaces 47 of side portions 48 of the lower half-frame 1. A plurality of keys 49 are inserted into the key-ways 45 and are firmly clamped to the surfaces 47 of the frame 1 by means of bolts 50.

The stator 2 is, of course, provided upon its inner periphery with a plurality of slots 52 in which are disposed conductors 53 of the primary windings of the machine. Inasmuch as the core half-units 30 and 31 are spaced apart, the conductors 53 bridge the gap between them and are exposed to the circulation of ventilating medium, as will hereinafter be explained.

The phase-converter rotor 3 comprises a pair of half-units 60 and 61, each of which embodies a plurality of laminations 62, end-plates 63 and 64 and rivets 65, or other suitable means for rigidly fastening the parts together to form a complete and self-contained unit. Each of the rotor half-units 60 and 61 is provided with longitudinal ventilating ducts 66, and the inner end plates 64 embody projecting annular portions 67 that are adapted for abutting engagement for the purpose of spacing the core half-units 60 and 61 apart. The end-plates 64 also are provided with integral radial vanes 68 between which a baffle plate 69 is positioned for the purpose of sub-dividing the intermediate space between the stator half-units 60 and 61 and obviating back pressures, as will hereinafter be more fully set forth. The rotor half-units 60 and 61 are rigidly clamped together by tie-bolts 70 to form a unitary structure which is keyed upon the shaft 6 in the usual manner and may be removed therefrom as a unit, if desired.

The periphery of the rotor 3 is provided with a plurality of slots 71 for receiving winding conductors 72 of a squirrel-cage winding such as are commonly employed in dynamo-electric machines of the induction type. The conductors 72 are electrically connected to a plurality of conducting end-rings 73, and said conductors bridge the space between the rotor half-units 60 and 61 and are directly exposed, at this point, to the ventilating medium.

Inasmuch as no upper half-frame is provided, the stator 2 is uncovered, and the end portions of the machine are enveloped by means of a plurality of inclosing casings 75 and 76 which may conveniently be made of sheet material and which are suitably secured to the end plates 33 of the stator 2 and to the end portions of the lower half-frame 1.

Assuming the phase converter to be in operation and a ventilating fluid or medium from a suitable source to be introduced through the respective end inlet openings 20 and 21 of the frame 1, a considerable pressure is produced in the inclosed end chambers 78 and 79 of the machine. A circulation of cooling fluid is, therefore, forced inwardly through the longitudinal ducts 36 and 66 of the stator 2 and rotor 3, respectively, into the intermediate space provided between their respective component half-units, from whence it is discharged past the exposed conductors 53 and 72 in a radial direction, either through the discharge openings 22 or directly to the surrounding atmosphere.

By reason of the employment of the central baffle plates 42 and 69, the intermediate spaces between the stator and rotor half-units are divided in such manner that the oppositely flowing streams of ventilating fluid through the longitudinal ducts are maintained entirely independent and separate, and do not react, the one upon the other, to obstruct the free flow, by creating back pressures. Inasmuch as the lengths of the core half-units are comparatively short, the cooling medium is particularly effective, even in proximity to the inner portions thereof.

Attention is now directed to the construction of the starting motor in which the projecting end portion 11 of the lower half-frame 1 is provided with a semi-cylindrical seat 80 which is co-axially related with respect to the other cylindrical seats 14, 17 and 18 of the frame 1. As already explained, the starting motor stator 4 is disposed in the seat 80, and, said stator may be of any well-known construction, although it preferably comprises a laminated core member 80ª which is secured firmly together between end-plates 81 and 82 by rivets 83. The inner end of the stator 4 abuts against a shoulder 84 of the frame portion 11 while the outer end thereof is in substantial alinement with the outer surface 85 of a downwardly projecting flange 86 which is provided with an annular lip 87.

The starting motor rotor 5 embodies a laminated core structure 88 and a commutator cylinder 89 which are assembled upon a suitable spider 90 in any well-known manner. The shaft 6 projects beyond the bearing member 8, and its projecting end 6ª is tapered to receive the spider 90 that carries the starting motor rotor, said spider being driven or pressed upon the tapered shaft in the same manner as pinions are customarily positioned. A key 91 serves to prevent relative movement between the shaft 6ª and the spider 90 and a nut 92 is screw-threaded upon the end of the shaft to lock the spider in position.

Secured to the semi-annular flange 86 of the projecting frame portion 11, is an end bracket 93 which is provided with a corresponding semi-annular flange 94 that engages the outer surface 85 of the flange 86 and rests upon the lip 87, and, at the same time, engages the outer end of the stator 4 and thus retains the stator in position. A plurality of bolts 95 secures the bracket 93 to the flange 86. The end bracket or bell 93 further embodies an outer ring or annular supporting member 96 which is concentrically disposed with respect to the shaft 6 and serves to support a plurality of brush-holders or sets of brushes 97 that coöperatively engage the commutator cylinder 89 in the usual manner. An inclosing casing 99, preferably of sheet material, is associated with the upper half of the stator 4 and embodies a projecting portion 99ª that covers the rear end of the starting motor, and another projecting portion 99ᵇ which envelops the commutator end thereof and is suitably secured to the brush-supporting ring 96.

By reason of the arrangement of parts of the starting motor, the stator 4 and the rotor 5 may be independently removed after having dismantled the end bracket 93, without disturbing, in any way, the assembly of the phase-converter parts. For instance, having dismantled the end bracket 93, the stator 4 may be removed longitudinally, or, after removing the lock-nut 92, the rotor 5 may be withdrawn from the tapered end 6ª of the shaft 6.

Inasmuch as the lower half-frame 1 is a single unitary member and serves in common to support the parts of both the phase converter and its starting motor, the several semi-cylindrical seats 14, 17, 18 and 80 may be machined with great accuracy by ordinary manufacturing methods, as but a single setting of the machine is necessary. Therefore, the co-axial concentric relation of the seats referred to is insured. Moreover, by reason of the combination of the phase converter and starting motor frames into a single unit only, a pair of bearing members 7 and 8 is required and the starting motor may be conveniently overhung, thereby minimizing the number of parts, reducing the weight and securing a compactness of construction that would otherwise be impossible.

Although we have, for illustrative purposes, shown and described a structure of more or less specific structural details and arrangement and location of parts, it is obvious that certain of the advantages and benefits of our invention may be derived from apparatus differing somewhat in its structural features, and, therefore, we desire that only such limitations shall be imposed as are indicated in the appended claims.

We claim as our invention:

1. In a dynamo-electric machine, the combination with stationary magnetizable means and a plurality of rotatable magnetizable members disposed in side-by-side relation and spaced apart and having longitudinal ventilating ducts, of a baffle plate interposed between said members and rigidly secured in position, and means for permitting a circulation of ventilating air from the respective ends of said machine through said longitudinal ducts into the space intermediate the magnetizable members.

2. In a dynamo-electric machine, the combination with stationary magnetizable means and a plurality of complete and independent rotatable magnetizable members disposed in side-by-side relation and spaced apart, and respectively provided with longitudinal ventilating ducts, of means for permitting a circulation of ventilating medium from the respective ends of said machine through said longitudinal ducts into the spaces intermediate the core members from which it is radially discharged, and a baffle plate interposed between said core members.

3. In a dynamo-electric machine, the combination with stationary magnetizable means and a plurality of rotatable magnetizable members disposed in side-by-side relation and spaced apart, and having longitudinal ventilating ducts, of means for permitting a circulation of ventilating medium inwardly through said ducts from the respective ends of the machine, and means disposed in the space between said rotatable magnetizable members for deflecting the circulated ventilating medium and discharging it outwardly in a radial direction.

4. In a dynamo-electric machine, the combination with stationary magnetizable means and a plurality of rotatable magnetizable members disposed in side-by-side relation and spaced apart, and having longitudinal ventilating ducts, of a common squirrel-cage winding disposed in slots on the periphery of said magnetizable members and bridging the intermediate space, and means for permitting a circulation of ventilating medium from the respective ends of the machine through said longitudinal ducts and into the intermediate space from whence it is discharged radially past the bridging squirrel-cage winding.

5. In a dynamo-electric machine, the combination with a two-part stationary magnetizable member, of a two-part rotatable magnetizable member in operative relation thereto, the parts of both magnetizable members being separated by an intermediate space and being provided with longitudinal ventilating ducts, and means for permitting the circulation of a ventilating medium from the respective ends of said machine inwardly through the ducts of both of said magnetizable members into the intermediate spaces between the component parts thereof.

6. In a dynamo-electric machine, the combination with a two-part stationary magnetizable member, and a two-part rotatable magnetizable member in operative relation thereto, the parts of both magnetizable members being separated by intermediate spaces and being provided with longitudinal ventilating ducts, of annular baffle plates interposed in the spaces between the parts of the stationary and rotatable magnetizable members respectively, and means for permitting a circulation of ventilating medium from the respective ends of said machine through the ventilating ducts of both the stationary and rotatable magnetizable members into the intermediate spaces between the parts thereof.

7. In a dynamo-electric machine, the combination with a complete frame comprising only lower half-frame portions having a plurality of unitary semi-cylindrical seats therein, of a plurality of cylindrical magnetizable cores disposed in side-by-side relation upon each of said seats and means for securing said cores rigidly to said frame.

8. In a dynamo-electric machine, the combination with a frame comprising only a lower half frame portion having a semi-cylindrical seat, a plurality of end ventilating openings and a row of centrally located ventilating openings, of a plurality of stationary cylindrical magnetizable core members disposed upon said seat and spaced apart to provide an intermediate space communicating with said central ventilating openings, means for rigidly securing said members to said frame, and means coöperating with the respective members and with said frame for inclosing the respective upper half end portions of said machine.

9. In a dynamo-electric machine, the combination with a frame comprising only a lower half-frame member having a semi-cylindrical seat therein, of a plurality of spaced stationary cylindrical magnetizable members resting in said seat and rigidly secured to said frame, and means coöperating with the respective stationary members and the frame for inclosing the upper end portions of said machine.

10. In a dynamo-electric machine, the combination with a lower half frame having a semi-cylindrical seat, a plurality of end inlet ventilating openings and centrally disposed outlet ventilating openings, of a plurality of uncovered stationary cylindrical magnetizable core members having longitudinal ventilating ducts resting in said seat and separated to provide an intermediate space communicating with said central ventilating openings, a plurality of members coöperating with said stationary members and said frame for inclosing the upper end portions of said machine, and a plurality of rotatable core members having longitudinal ventilating ducts and separated to provide an intermediate space communicating with the space between the stationary core members and the central discharge openings.

11. In a dynamo-electric machine structure, the combination with a lower half-frame having a plurality of co-axial cylindrical seats of different diameters, of a plurality of uncovered stationary cylindrical magnetizable cores of corresponding diameters adapted to rest upon the respective seats.

12. In a dynamo-electric machine structure, the combination with a lower half-frame having a plurality of co-axial cylindrical seats of different diameters and a plurality of co-axial bearing member seats, of a plurality of uncovered stationary cylindrical magnetizable core members of corresponding diameter adapted to rest upon the respective seats of different diameters, bearing members disposed in said bearing member seats, a shaft carried by said bearing members, and a plurality of rotatable cylindrical magnetizable core members of different sizes mounted upon said shaft in operative relation to the respective stationary core members of different diameters.

13. In a dynamo-electric machine structure, the combination with a lower half-frame having a plurality of co-axial cylindrical seats of different diameters and a plurality of co-axial bearing member seats, of a plurality of uncovered stationary cylindrical magnetizable core members of corresponding diameters adapted to rest upon the respective seats of different diameters, bearing members disposed in said bearing member seats, a shaft carried by said bearing members and tapered at the end corresponding to the core member of less diameter, a rotatable magnetizable core member mounted upon said shaft intermediate the bearing members, and a rotatable magnetizable core member of less diameter having a tapered fit with the tapered end of said shaft.

14. The combination with a main dynamo-electric machine comprising relatively rotatable magnetizable members, a supporting frame for the stationary member and embodying an integral projection end portion, and a shaft rotatably mounted in said frame and projecting beyond it in coöperative relation to said projecting end portion of said frame, of a stationary magnetizable member supported by said end portion and a rotatable magnetizable member removably disposed upon the projecting end of said shaft in coöperative relation to the said stationary member.

15. The combination with a main dynamo-electric machine embodying a supporting frame having a semi-cylindrical projecting end portion, a bearing member intermediate the projecting end portion of the frame and the main body thereof, and a shaft carried in part by said bearing member and projecting beyond the bearing member in coöperative relation with the projecting end portion of the frame, of a stationary magnetizable member seated in said semi-cylindrical projecting portion and adapted to be longitudinally removed therefrom, and a rotatable magnetizable member mounted upon the projecting end of said shaft and removable therefrom in a longitudinal direction.

16. In a dynamo-electric machine, the combination with a supporting frame having a semi-cylindrical seat therein, a stationary cylindrical magnetizable core member disposed in said seat and removable therefrom in a longitudinal direction, means coöperating with said frame and said magnetizable member for retaining said member in position, and a shaft supported at one end of said frame, of a rotatable magnetizable core member secured to the free end of said shaft and adapted to be removed therefrom in a longitudinal direction.

17. In a dynamo-electric machine, the combination with a frame comprising only a lower half member having a semi-cylindrical seat, a plurality of end ventilating openings and a row of centrally located ventilating openings, of a plurality of spaced cylindrical magnetizable cores disposed in side-by-side relation upon said seat; the space between said cores communicating with said central ventilating openings in said frame.

18. In a dynamo-electric machine, the combination with a frame comprising only a lower half member provided with semi-annular end portions and a semi-cylindrical seat intermediate said end portions, of a plurality of cylindrical magnetizable cores disposed in side-by-side relation upon said seat and between said end portions and means for securing said cores to said seat.

In testimony whereof, we have hereunto subscribed our names this 19th day of March, 1915.

RUDOLF E. HELLMUND.
JOHN V. DOBSON.

Witnesses:
W. A. CLARK,
B. B. HINES.